Feb. 3, 1970 V. M. MOGILEVSKY 3,493,851
VIBRATION MAGNETOMETER FOR MEASURING TANGENTIAL
COMPONENT OF MAGNETIC FIELD ON FLAT
SURFACE OF FERROMAGNETIC SAMPLES
Filed Jan. 27, 1966

United States Patent Office 3,493,851
Patented Feb. 3, 1970

3,493,851
VIBRATION MAGNETOMETER FOR MEASURING TANGENTIAL COMPONENT OF MAGNETIC FIELD ON FLAT SURFACE OF FERROMAGNETIC SAMPLES
Vitaly Moritsovich Mogilevsky, ul. Gogolya 49, kv. 39, Novosibirsk, U.S.S.R.
Filed Jan. 27, 1966, Ser. No. 523,391
Int. Cl. G01r 33/02
U.S. Cl. 324—47                5 Claims

ABSTRACT OF THE DISCLOSURE

Magnetometer including two coil sections of different length, physically arranged in parallel and electrically arranged in series opposition, the sections being vibrated and coupled to a filter tuned to the oscillation frequency of the coil. The coils have ends which are arranged adjacent the piece to be tested and ends which are remote with respect thereto. The first said ends of the coils are spaced from each other. The second said ends (called "idle ends") are adjacent each other.

---

The present invention relates to devices for measuring magnetic values and particularly to devices for measuring the tangential component of magnetic field intensity on the surface of ferromagnetic materials, as well as for measuring induction in the narrow gaps of magnetoconductors such as, for instance, instruments of a magnetoelectric system.

Known magnetometers have transducers, in the form of a rectangular coil supported in a holder by means of phosphor bronze spring suspensions and provided with energizing and deenergizing coils located in the field of a permanent magnet and having a positive feedback through a stabilized amplifier, thus insuring the maintenance of undamped sinusoidal oscillations of the measuring coil.

The signal, taken from the measuring coil, contains a component which is proportional to the tangential component of the magnetic field intensity at a point about which the measuring coil oscillates. After having been amplified, the signal of the measuring coil is rectified in the phase-sensitive detector and is measured by a voltmeter.

A disadvantage of known magnetometers is their systematic error due to the fact that the measuring coil vibrates about a point removed from the surface of the sample under examination and thus measures the tangential component at this point rather than the tangential component on the surface of the sample. Reduction of this error is achieved by decreasing the distance between the measuring coil and the surface of the sample, thus decreasing the amplitude of vibrations and, consequently, the sensitivity and the interference-resistance of the magnetometer.

An object of the present invention is to provide a magnetometer which is highly sensitive and accurate in operation.

Another object of this invention is to increase the interference-resistance of the magnetometer.

The present invention is characterized, for example in that a vibrating rectangular measuring coil is made of two unequal-length sections connected in series opposition and arranged in parallel in space, with their "idle ends" (this term will be used throughout to indicate the ends remote from the piece being tested and which are, therefore, in a region in which the tangential component of the sample field is substantially zero) being coming out in the same plane, while the holder has a bearing surface ensuring an orthogonal position of the measuring coil in relation to the tangential component of the magnetic field on the surface of the ferromagnetic material under examination.

Stated otherwise, the measuring coil has an elongated rectangular form and consists of two sections having equal numbers of turns and different length and axes which are parallel to the surface of the material. The end faces of the coil sections that are turned towards the surface of the sample during measurements, which are hereinafter termed "working ends," are spaced from each other at a certain fixed distance. The opposite end faces of the coil which are disposed in the region where the tangential component is equal to zero ($H_t=0$) and which, as noted above, are hereinafter termed idle ends" are positionally coincident.

It is feasible to arrange the sections of the vibrating rectangular measuring coil with one inside the other.

The magnetometer can be equipped with a computing device whose input is connected to the sections of the vibrating rectangular measuring coil and the output of which is connected to a filter, said computing device determining the tangential component of the magnetic field intensity on the surface of a ferromagnetic material from the values of the magnetic field intensity measured by the sections of the vibrating coil.

It is feasible to make the computing device as an operational amplifier.

The invention will become more apparent from the following description of a preferred embodiment as illustrated in the accompanying drawing.

Figure 1:
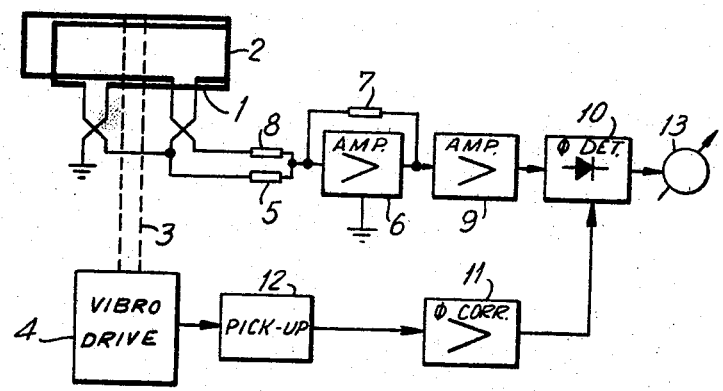
FIG. 1 is a block diagram of a vibration magnetometer according to the present invention.

The intensity of the magnetic field is measured by a vibrating coil made up of two rectangular secions 1 and 2 (FIG. 1) which are different in length, equal in width and connected in series opposition. The measuring vibrating coil is connected by means of a cantilever member or strip 3 with a vibrator or vibro-drive 4. Section 1 of the measuring coil is connected to a resistor 5 in the input circuit of an operational amplifier 6 having a resistor 7 in a feedback circuit.

The measuring coil sections 1 and 2, connected in series opposition, are connected to a resistor 8 in the input circuit of the operational amplifier 6. The input of the operational amplifier 6 is connected to the input of an amplifier 9 having a pass-band limited at the upper frequency by the oscillation frequency of the measuring coil. Because the amplifier 9 has a limited pass-band, it constitutes a filter.

The output of the amplifier 9 is provided with a phase-sensitive detector 10. The reference voltage is applied to the phase-sensitive detector 10 from a phase-corrector 11 whose input is connected to a pick-up arrangement 12 linked with the vibro-drive 4. An indicating voltmeter 13 is coupled to the output of the phase-sensitive detector 10.

Figure 2:
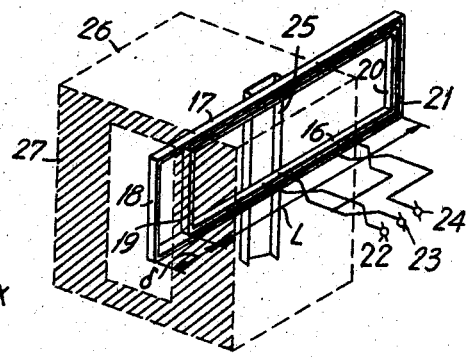
FIG. 2 is a perspective view of measuring coil used in the magnetometer of FIG. 1.

FIG. 2 shows a two-sectional vibrating rectangular measuring coil. Section 16 of L length is arranged inside section 17 of L+δ length so that the distance between working ends 18 and 19 of the respective sections 17 and 16 is equal to δ and their idle ends 20 and 21 are conjugated. The windings of these sections are connected in series opposition so that the measuring coil has three output terminals of which the terminal 22 is grounded, the terminal 23 is connected to the resistor 5 of the operational amplifier 6 (FIG. 1), and the terminal 24 to the resistor 8.

The measuring coil is connected to the vibro-drive 4 through a light-weight cantilever member 25, e.g. of a U-shaped cross-section, and is arranged in a holder 26 so that the latter's surface 27, pressed against the surface of sample 28 (FIG. 3) during measurement, is placed at 90° to the plane of the measuring coil.

Figure 3:
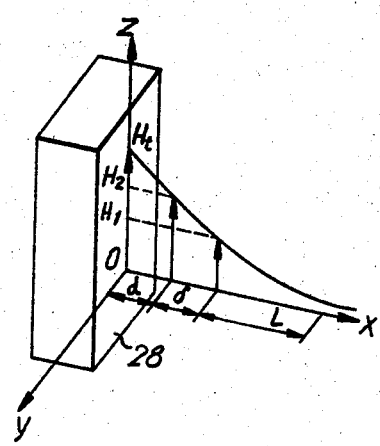
FIG. 3 shows conditionally the dependence of the tangential component of the magnetic field intensity upon the distance from the point of measurement to the surface of a ferromagnetic sample.

FIG. 3 shows conditionally the dependence of the change in the magnetic field tangential component upon the distance from the measurement point to the surface of the ferromagnetic sample 28, for instance, a permanent magnet on whose surface, located in the YOZ plane, acts the magnetic field tangential component $H_t$. The measuring coil of the magnetometer is located in the plane YOX so that the end 18 of the section 17 (which end is positioned a depth $d$ within the holder) comes out at a $d$ distance from the surface of the sample while the end 19 of the section 16—at a $d+\delta$ distance from this surface. the value being the difference in the lengths of the sections 1 and 2.

At sinusoidal oscillation of the coil at frequency $\omega$ and amplitude $a$, the electromotive force is induced in the sections 1 and 2:

$$E_1 = E_{H_1} \cos \omega t + E_{g_1} \sin 2\omega t$$

$$E_2 = E_{H_2} \cos \omega t + E_{g_2} \sin 2\omega t$$

$$E_{H_1} = n\mu_0 ba\omega H_1 = K_1 H_1$$

$$E_{H_2} = n\mu_0 ba\omega H_2 = K_2 H_2$$

where:
$n$ = number of turns,
$b$ = width of section,
$\mu_0$ = magnetic permeability of air, $$E_{g_1} = n\mu_0 ba^2 \omega g_1 \quad E_{g_2} = n\mu_0 ba^2 \omega g_2$$

$g_1$, $g_2$ = gradient of magnetic field tangential component at points $x=d$ and $x=d+\delta$. Since the sections 1 and 2 are connected in series opposition, at $K_1=K_2=K$ and $g_1=g_2=g$ the summary signal will be equal to:

$$E_{21} = K(H_2 - H_1) \cos \omega t = K\Delta H_1 \cos \omega t$$

From $g$=const it follows that $$H_t = H_1 + \Delta H_1 \frac{d+\delta}{\delta}$$

The resistance 5 and 7 of the operational amplifier 6 being equal, and the relationship of the values of resistances 7 and 8 being $$\frac{d+\delta}{\delta}$$

the signal at the output of the operational amplifier 6 will be:

$$u_6 = KH_1 \cos \omega t + K\Delta H_1 \frac{d+\delta}{\delta} + E_g \sin 2\omega t$$

At the output of the amplifier 9, which does not pass frequencies higher than $\omega$, the signal is equal to:

$$u_9 = K_9 \cdot KH_t \cos \omega t$$

Where: $K_9$ is the amplification factor of the amplifier 9. Signal $u_9$ is rectified by means of the phase-sensitive detector 10 and is measured with the help of the voltmeter 13 graduated in magnet units. The reference voltage of the phase-sensitive detector 10 is taken from the vibro-drive 4 by means of the pick-up arrangement 12, for instance, of an induction type, then it is amplified by the phase-corrector 11 and fed to the phase-sensitive detector 10.

While a preferred embodiment of the present invention has been disclosed in the foregoing description thereof, it will be readily understood that various modifications and versions may occur to those skilled in the art, without departing from the spirit and scope of the invention.

Therefore it is intended that no limitations be placed on the invention except as defined by the spirit and scope of the appended claims.

What is claimed is:
1. A vibration magnetometer for measuring parameters of a magnetic field, in particular the tangential component of the magnetic field intensity on the surface of a ferromagnetic material comprising: a rectangular measuring coil including two rectangular sections of different lengths connected in series opposition and arranged in parallel in space and having axes parallel to said surface, said sections including first ends adjacent said surface and spaced from each other a predetermined distance and second ends opposite said first ends and positionally coincident with each other; vibration means rigidly linked to and vibrating said rectangular measuring coil at a predetermined frequency to generate a signal on the coil, a filter tuned to said frequency and connected to said coil; and a holder for holding said rectangular measuring coil, said holder having a bearing surface so related to the surface of said material as to provide for an orthogonal position of the measuring coil in relation to the surface of the ferromagnetic material.

2. A vibration magnetometer for measuring parameters of a magnetic field, in particular the tangential component of the magnetic field intensity on the surface of a ferromagnetic material, comprising: a rectangular measuring coil including two rectangular sections of different lengths, connected in series opposition and arranged in parallel in space and having axes parellel to said surface, one inside the other, said sections including first ends adjacent said surface and spaced from each other a predetermined distance and second ends opposite said first ends and positionally coincident with each other; vibration means rigidly linked to and vibrating said rectangular measuring coils at a predetermined frequency to generate a signal on the coil; a filter tuned to said frequency and connected to said coil; and a holder for holding said rectangular measuring coil, said holder having a bearing surface so related to the surface of said material as to provide for an orthogonal position of the measuring coil in relation to the surface of the ferromagnetic material.

3. A vibration magnetometer for measuring parameters of a magnetic field, in particular the tangential component of the magnetic field intensity on the surface of a ferromagnetic material, comprising: a rectangular measuring coil including two rectangular sections of different lengths, connected in series opposition and arranged in parallel in space and having axes parallel to said surface and including first ends adjacent said surface and spaced from each other a predetermined distance and second ends opposite said first ends and positionally coincident with each other; vibration means rigidly linked to and vibrating said rectangular measuring coil at a predetermined frequency to generate a signal on the coil; a filter tuned to said frequency and connected to said coil; a holder for holding said rectangular measuring coil, said holder having a bearing surface so related to the surface of said material as to provide for an orthogonal position of the measuring coil in relation to the surface of the ferromagnetic material and computing means including an input connected to the sections of said measuring coil and an output connected to said filter, said computer means converting the signal in the coil to a signal proportional to the tangential component of the field on said surface.

4. A vibration magnetometer, as claimed in claim 3, wherein the computing device is an operational amplifier.

5. A vibration magnetometer for measuring parameters of a magnetic field, in particular the tangential component of the magnetic field intensity on the surface of a ferromagnetic material, comprising: a rectangular measuring coil including two rectangular sections of different lengths, connected in series opposition and arranged one inside the other in parallel in space and having axes parallel to said surface and including first ends adjacent said surface and spaced from each other a predetermined distance and second ends opposite said first ends and positionally coincident with each other; vibration means rigidly linked to and vibrating said rectangular measuring coil at a predetermined frequency to generate a signal on the coil; a filter tuned to said frequency and connected to said coil; a holder for holding said rectangular measuring coil, said holder having a bearing surface so related to the surface of said material as to provide for an orthogonal position of the measuring coil in relation to the surface of the ferromagnetic material; and computing means including an input connected to the sections of said measuring coil and an output connected to said filter, said computer means converting the signal in the coil to a signal proportional to the tangential component of the field on said surface.

References Cited

UNITED STATES PATENTS

| | | | |
|---|---|---|---|
| 2,103,224 | 12/1937 | Schweitzer et al. | 324—37 |
| 2,776,404 | 1/1957 | Caldecourt | 324—47 |
| 3,089,084 | 5/1963 | Diamond | 324—47 X |

FOREIGN PATENTS

| | | |
|---|---|---|
| 1,044,266 | 11/1958 | Germany. |
| 1,173,412 | 2/1959 | France. |

RUDOLPH V. ROLINEC, Primary Examiner

R. J. CORCORAN, Assistant Examiner